Figure 1:
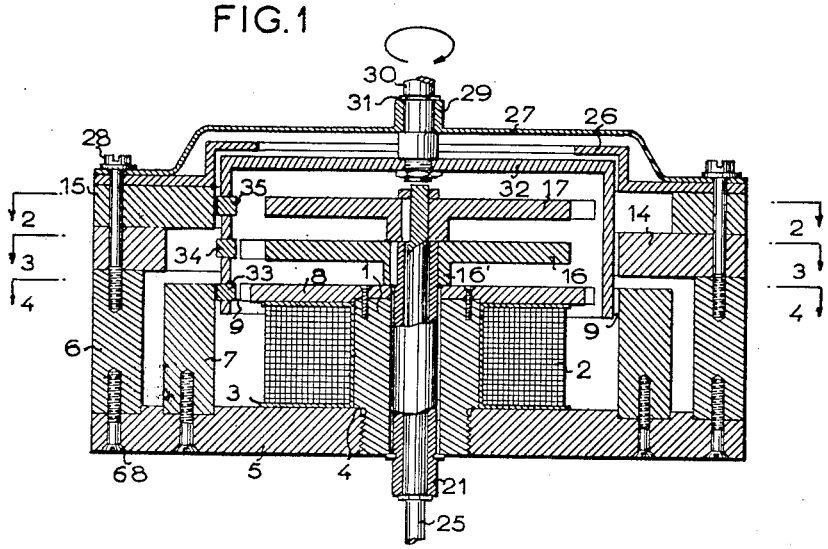

Aug. 7, 1956  G. REYMONENQ ET AL  2,758,227
CURRENT IMPULSE GENERATOR

Filed Jan. 28, 1955  2 Sheets-Sheet 1

Inventors
G. Reymonenq
P. Ouvrard
By Shercock Dowring Teeble
Attys.

Aug. 7, 1956   G. REYMONENQ ET AL   2,758,227
CURRENT IMPULSE GENERATOR
Filed Jan. 28, 1955   2 Sheets-Sheet 2
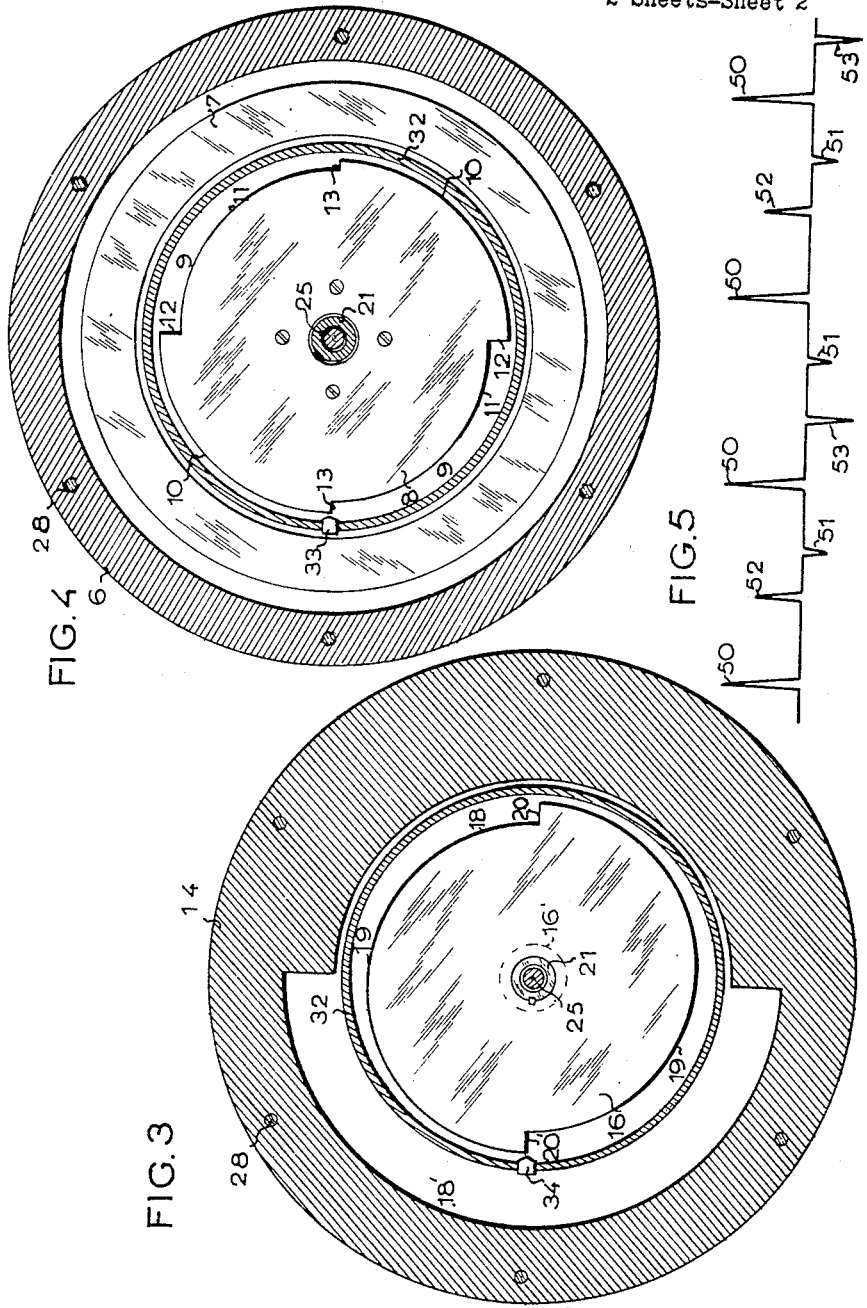
Inventors
G. Reymonenq
P. Ouvrard
By Glascock Downing Seebold
Attys.

United States Patent Office 2,758,227
Patented Aug. 7, 1956

2,758,227

CURRENT IMPULSE GENERATOR

Gaston Reymonenq and Paul Ouvrard, Donges, France, assignors to Antar Petroles de l'Atlantique, Paris, France Application January 28, 1955, Serial No. 484,730

Claims priority, application France November 24, 1954

11 Claims. (Cl. 310—155)

The present invention relates to current impulse generators and, more particularly, to current impulse generators adapted to create at least two periodical impulses the phase of at least one of which is likely to be shifted.

An object of the invention is to provide a current impulse generator of this character adapted to create trains of periodical current impulses comprising at least one timing impulse, one or more signal impulses and, if desired, a calibration impulse, the signal transmitted by the signal impulse or impulses being identified by its or their position (or phase) with respect to the timing impulse, the various impulses, timing, calibration, signal 1, signal 2, etc. furthermore being identified either by their polarity or by their amplitude (large or small).

Current impulse generators of the character contemplated may be used in cooperation with transmission systems or computers and, more particularly, with remote indicating and measuring apparatus. A particular application thereof is the remote measurement of level elevations in tanks as disclosed in our co-pending patent application Ser. No. 484,729.

Various designs of electromechanical impulse generators are already known. In most of the conventional devices, each impulse is created by a coil inserted in a magnetic circuit the reluctance of which is periodically varied by causing a suitable part to move cyclically. Thus, by way of example, in the remote indicating device disclosed in the above-mentioned patent application, each impulse (timing, measurement or calibration) is generated by a magnetic pick-up head with a permanent magnet in front of which is adapted to rotate a spiral drum or cam made of a metal having a high permeability and the outline of which is formed with an abrupt step. Each time this step passes the pick-up head the reluctance of the magnetic circuit (completed through air) is suddenly varied with the result that an impulse is induced in the coil. The polarity of said impulse depends on the rotational direction of the cam. A device of this type requires as many coils (pick-up heads) as there are impulses to be generated.

When it is desired to amplify such impulses a separate connection to the amplifier from the individual coils is often necessary and this is a complication. Furthermore, the coils, which create the various impulses, as a rule, are arranged about the constant speed rotary shaft which carries the cams corresponding to the individual impulses. In order to vary the phase (or position) of one measurement impulse with respect to the timing impulse, it is necessary that the signal impulse generating coil be possibly rotated about the cam shaft which is a complication from the mechanical point of view, as far as the coil supports and their driving means are concerned and also from the electrical point of view since slip rings are required, which may be a source of failure. Furthermore, such a construction is costly. Finally, the open magnetic circuits have a rather poor efficiency and require, therefore, fairly large cams, as well as powerful magnets for the pick-up heads.

The object of the present invention is to provide a current impulse generator that has none of the above mentioned drawbacks, and, in particular, a single current impulse generating coil which is stationary, and common parts for the various magnetic circuits.

Figure 2:
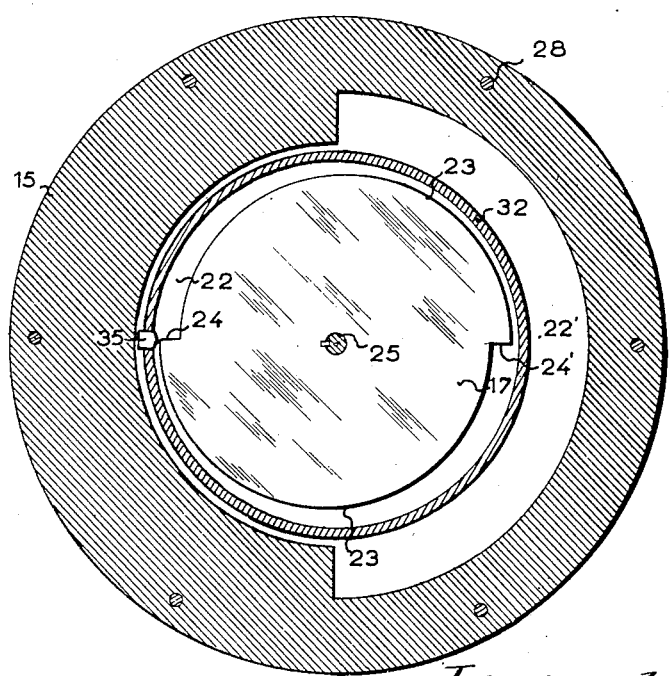

Other and further objects and advantages of the invention will be apparent to those skilled in the art, from a consideration of the following description of one particular embodiment of the invention, shown by way of example, in the accompanying drawings, in which:

Fig. 1 is an axial section of an impulse generator embodying the invention and so designed as to create a timing impulse and two measurement impulses, Figs. 2, 3 and 4 are cross-sectional views of the generator of Fig. 1, taken along the lines 2—2, 3—3 and 4—4 respectively of Fig. 1, and Fig. 5 is a diagram of the impulses obtained by means of the device of Fig. 1.

Referring now particularly to Figs. 1 to 4 inclusive, there is shown an impulse generator adapted to emit periodically a number of impulses, namely, a timing impulse, a calibration impulse and two signal impulses, for instance with a view to transmit measurements. This impulse generator comprises three magnetic circuits with some common elements. The magneto-motive force for all three circuits is supplied by a cylindrical permanent magnet 1 bored and surrounded with the pick-up coil 2, which is wound on a reel 3. The magnet 1 has a shoulder 4 engaged by a circular flange 5 of mild iron. Mounted on the flange 5 are two coaxial rings 6 and 7 made of a ferro-magnetic material, secured as by means of screws 68 and preferably positioned in a centering shoulder or annular groove. Positioned on the core 1 is a stationary cam 8 which completes a first magnetic circuit including the following elements: core 1, flange 5, ring 7, cam 8, with an air gap 9.

The cam 8 has two protruding portions 10 (Fig. 4) bounded by a cylindrical outline coaxial with the ring 7 and two recessed portions 11 bounded by a special outline. The protruding portions 10 and the recessed portions 11 are united together by means of two large synchronizing teeth 12 diametrically positioned and by two small calibration teeth 13 also diametrically positioned.

Mounted upon the ring 6 are two pole pieces 14 and 15 assuming the shape of thick washers and having an outer diameter equal to that of ring 6 while their inner diameter is substantially equal to the inner diameter of the inner ring 7 over one half-circle and equal to the inner diameter of the ring 6 over the other half-circle (Figs. 2 and 3), thus forming a protruding portion extending over 180° and a recessed portion also extending over 180°.

These pole pieces are so positioned that the protruding portion of one of them is in register with the recessed portion of the other one.

Coplanar with the pole pieces 14 and 15 are positioned cams 16 and 17 respectively which complete a second and a third magnetic circuits. Said second magnetic circuit includes: core 1, flange 5, right-hand portion of ring 6, right-hand protruding portion of pole piece 14, cam 16 while said third magnetic circuit may be traced as follows: core 1, left-hand portion of ring 6, left-hand protruding portion of pole piece 15, cam 17, hub 16' of cam 16. Between the pole piece 14 and cam 16 of the second circuit (Fig. 3) is a variable gap the thickness of which is relatively small as at 18 within the right-hand semi-circle and much larger as at 18' within the other semi-circle, so that the magnetic flux is allowed to circulate practically in the right-hand portion only of this circuit. The cam 16 has two spiral shaped portions 19 connected to each other through two teeth 20, 20'. The cam 16 which has a reinforced hub 16' is mounted on a hollow spindle 21 made of a non-magnetic material, for instance brass, and adapted for rotational movement within the bore of the core 1. Said hollow spindle makes it possible to rotate the cam as a function of the signal to be transmitted, for instance by an angle proportional to a quantity measured and, more particularly, to the number of meters indicating the elevation of the level in a tank.

In a similar manner, an air gap is to be found between the pole piece 15 and the cam 17 in the third circuit with a left-hand portion of small width 22 and a right-hand wider portion 22' (Fig. 2), so that the magnetic flux flows practically on the left side only. The cam 17 is symmetrical with respect to the cam 16 and has two spiral portions 23 extending in a reverse direction as compared with the spiral shaped portions 19, connected together by two teeth or steps 24, 24'. The cam 17 is mounted on a spindle 25 made of an amagnetic material and adapted to revolve inside the hollow shaft 21, in order to permit positioning the teeth 24, 24' in response to a second signal, for instance a signal corresponding to the quantity of a second measurement (more particularly, for instance, a number of centimeters above a whole number of meters for indicatinig the level in a tank). Placed on the pole piece 15 is a ring 26 located above the gap 22, 22' for the purpose of shunting the flux across said gap.

Above the pole pieces 14 and 15 is a cap 27 of an amagnetic material and secured by screws 28 which also serve for holding the pole pieces 14, 15 firmly against the ring 6. The cap 27 carries a bearing 29 in which a shaft 30 is adapted to be rotatably driven at a constant speed by a synchronous motor (not shown) and retained on the bearing 29, for instance by means of a thrust ring 31. Secured at the lower end of this shaft, as by means of a screw-thread and a nut, is a cylindrical drum or inverted cup shaped member 32 made of an amagnetic material such as brass or presspahn and the cylindrical wall of which is inserted into the gaps 9, 18—18', 22—22', of the three magnetic circuits. On a generatrix of said cylinder 32 are positioned three magnetic "index marks" 33, 34, 35 constituted by small prisms, for instance of iron, the dimensions of which are computed in such a manner, that they are able to move just with the suitable clearance between the pole pieces and the teeth of the cams 8, 16 and 17 respeciveiy.

In order that the operation of the device be readily understood, reference will first be made to Fig. 4. It will be seen that the magnetic index 33 passes twice in each revolution the protruding portions 10 of the cam 8 and its presence in the air gap decreases the reluctance of the first magnetic circuit, while it also passes twice the receded portions 9 and its presence in a wide air gap has but little effect upon the reluctance. Each time the index 33 passes the teeth 12 or 13 of the cam 8 the reluctance, therefore, is varied stepwise. This variation is greater opposite the teeth 12 than opposite the teeth 13, said variations being of opposed signs.

Therefore, for each revolution of the cylinder 32 there will be available two large amplitude impulses, for instance positive impulses 50 (Fig. 5) which may be used as synchronizing or timing impulses and two impulses of smaller amplitude and opposite polarity, for instance negative impulses (51) with a fixed phase with respect to the timing impulses and which may be used as calibration impulses. The phase of these impulses may be predetermined at an arbitrary value by conveniently selecting the angle between the teeth 12 and 13.

Referring now to Figs. 2 and 3, it will be seen that the indexes 34, 35 similarly cause the reluctance of the second and third magnetic circuits to vary abruptly as they pass the teeth 20 and 24 respectively of the cams 16 and 17, once for each revolution. On the contrary, they create no impulse by passing the teeth 20' and 24' since the receded portions of the pole pieces afford a wide air gap 18', 22' in which the presence of the indexes 34, 35 does not materially modify the reluctance of the circuit because the flux therein is negligible. The impulse 52 created by the passage of the index 34 opposite the tooth 20 of the cam 16 is emitted in the course of the first half-turn of the drum 32. Owing to the shape of the pole piece 15 which is symmetrical with respect to that of the pole piece 14, the impulse 53 created by the passage of the index 35 opposite the tooth 24 of the cam 17 is created in the other half turn of the drum 32. The cam 8 (see Fig. 4) is angularly positioned in such a manner that the timing impulses 50 determine the boundaries of said two half-turns. The impulse 52, therefore, will be positioned between a first and a second timing impulse and the impulse 53 between the second and a third timing impulse, and so on.

Since the cams 16 and 17 are symmetrical, the impulses created will have opposite polarities e. g. 52 will be positive and 53 negative. By virtue of the presence of the magnetic shunt which constitutes a branch for a portion of the magnetic flux to flow, which otherwise would be directed through the index 35, the strength of the impulse 53 may be adjusted; it is assumed, here, that 52 and 53 have the same amplitude, a set of impulses as indicated in Fig. 5 is, hence, available.

The phase (or position) of the measurement impulses 52 and 53 with respect to the timing impulse depends on the position of the teeth 20, 24 of the cams 16 and 17. This position may be varied by angularly setting the shafts 21 and 25.

When the device is adapted for a remote measurement the shafts 21 and 25 will be operatively connected to the measuring apparatus.

It will be observed that the cams are not subjected to any mechanical stress and that, therefore, they may be moved without it being necessary to exert an effort therefor.

In particular, if the impulse generator embodying the present invention is applied to the remote measurement of level elevations in tanks as disclosed in our above mentioned patent application Ser. No. 484,729, the shaft 21 may be operatively connected to the shaft that rotates continuously by an angle proportional to the number of centimeters of the level elevation, while the shaft 25 is driven stepwise a given angle each time the whole number of meters will be varied one unit. In this case, the entrance circuit to the amplifier will be simplified since a single coil creates all the impulses. The fact that the impulses in response of the meter and centimeter measurements are emitted only every other period changes nothing in the use of the oscillograph which is the indicator tuned on the period of the timing impulses owing to the remanence of the screen.

By synchronizing the oscillograph with the period of two timing impulses, both types of impulses, however, could be separated in order to differentiate them, in case they were not already differentiated by any other means.

The present invention is in no way restricted to the embodiment above described which is given merely as an example, and many modifications may be elaborated.

As a first modification, provision may be made for the transmission of more than two measurement impulses by means of additional magnetic circuits, for instance by splitting the inner circuit into two circuits in a manner similar to that used for both outer circuits. Pole pieces similar to 14, 15 could also be provided with an active portion corresponding only to ⅓ or ¼ of a circumference in combination with three or four cams, three or four sets of impulses thus being available.

In order to create the magneto-motive force in all three circuits, an iron core surrounded with an energizing coil supplied with a current of constant strength could be susbtituted for the permanent magnet 1. The latter also may be replaced by a passive iron core while two annular magnets are substituted for the rings 6 and 7 of the magnetic circuit.

Furthermore, the magnetic shunt 26 may be omitted and impart different amplitudes to the impulses 52 and 53 either by giving different heights to the teeth 20 and 24 of the cams 16 and 17, or by giving to these cams and the corresponding pole pieces thicknesses widely different from each other (for instance in a 1:2 ratio).

Finally, the pole pieces 14 and 15 may have a true annular shape so that two measurement impulses are available over each revolution.

Also, cams with respectively a single tooth or, on the contrary, three or four teeth, or more may be adopted with the only result that the periodicity of the timing and measurement impulses are modified, for instance in order to avoid a mechanical speed reduction.

As many changes could be made in the above construction, and many apparently widely different embodiments of this invention could be made without departing from the scope of the claims it is intended that all matter contained in the above description or shown in the accompanying drawings shall be interpreted as illustrative and not in a limiting sense.

What is claimed is:

1. A current impulse generator adapted to create at least two periodical impulses, the phase of at least one of which is likely to be shifted, said generator comprising, in combination, at least two magnetic circuits including a stationary common cylindrical core having a circular base flange at one end thereof and each a magnetized portion and a small air gap, said magnetized portion being constituted by an annular member extending from said base flange around said core at some distance thereof, a stepped disc in each of said magnetic circuits forming one side of said air gap, a single current impulse generating coil surrounding said stationary common core of said magnetic circuits, a plurality of magnetic material elements adapted to be move cyclically and synchronously through said air gaps in order to create sudden variations in the reluctances of said magnetic circuits as they pass the steps of said stepped discs and, hence, to create corresponding current impulses in said coil, and means for mechanically shifting at least one of said stepped discs in order to shift the phase of the corresponding current impulse created in said coil.

2. A current impulse generator according to claim 1, wherein said cylindrical core is a permanent magnet.

3. A current impulse generator according to claim 1, wherein said annular member is a permanent magnet.

4. A current impulse generator according to claim 1, wherein one of said discs is rigid with said core.

5. A current impulse generator according to claim 1, wherein at least one of said discs is carried by a shaft axially mounted for pivotal movement in said core.

6. A current impulse generator according to claim 1, wherein said magnetic elements are carried by a member rigid with a shaft coaxial with said core and adapted to be operatively connected with rotational driving means.

7. A current impulse generator according to claim 1, wherein said magnetic elements are carried by a cup-shaped member made of a non-magnetic material and rigid with a shaft coaxial with said core and adapted to be operatively connected with rotational driving means.

8. A current impulse generator according to claim 1, wherein the peripheral portion of said discs includes at least one spiral shaped portion terminating into a radial step.

9. A current impulse generator according to claim 1, wherein the peripheral portion of said discs includes at least one spiral shaped portion terminating into a radial step, the radius of a spiral shaped portion on one of said discs increasing in a given rotational direction as it decreases on another of said discs.

10. A current impulse generator according to claim 1, wherein the peripheral portion of said discs includes at least one spiral shaped portion terminating into a radial step, the step at one end of a given spiral portion extending radially a longer distance than the step at the other end of said given spiral portion.

11. A current impulse generator according to claim 1, wherein the peripheral portion of said discs includes a concentrical portion and a spiral-shaped portion connected together by radial steps.

References Cited in the file of this patent

UNITED STATES PATENTS

| | | |
|---|---|---|
| 1,687,233 | Stoller | Oct. 9, 1928 |

FOREIGN PATENTS

| | | |
|---|---|---|
| 114,412 | Australia | Dec. 24, 1941 |
| 286,792 | Italy | June 22, 1931 |